United States Patent Office 2,905,735
Patented Sept. 22, 1959

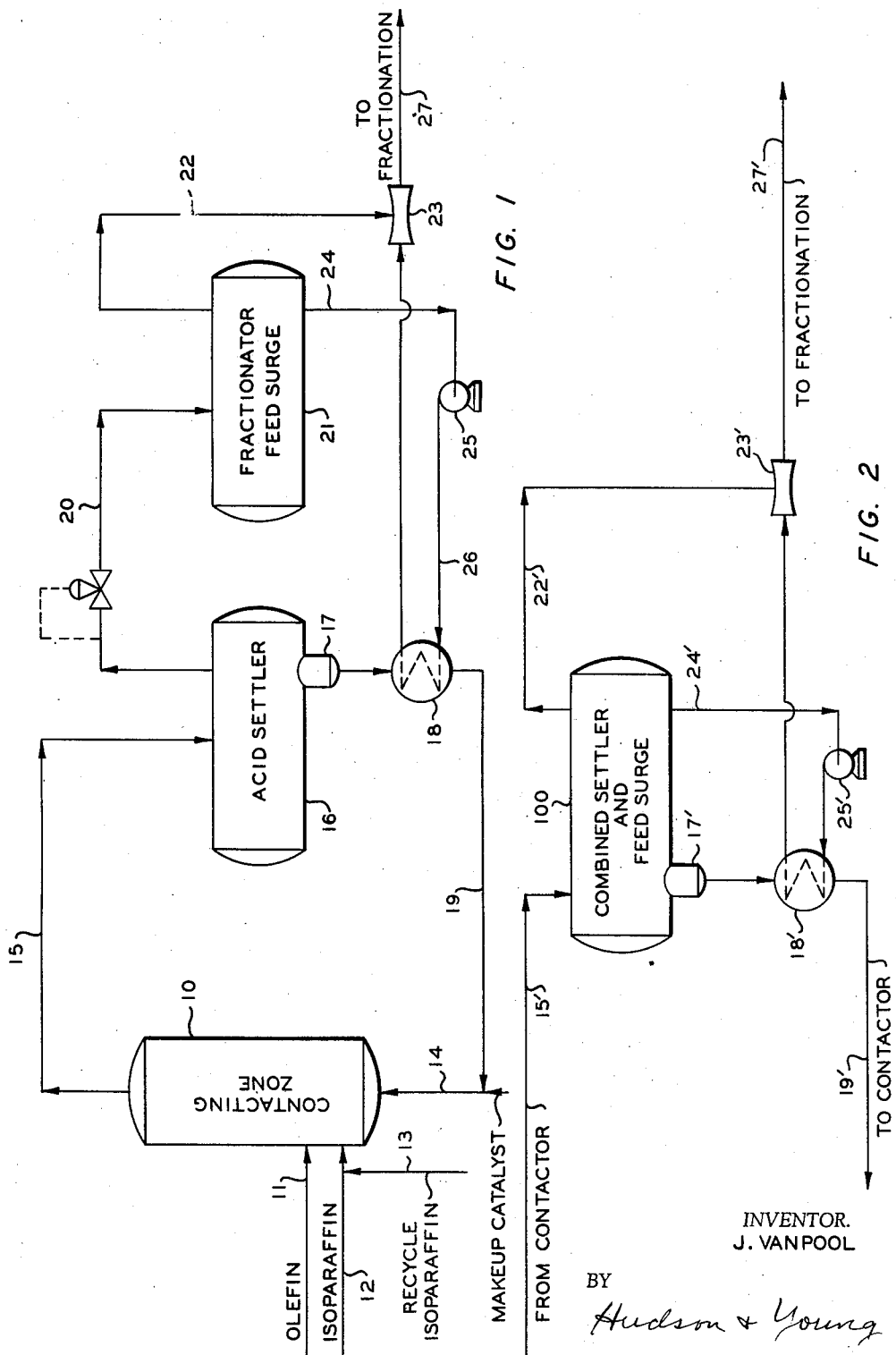

2,905,735

ALKYLATION TEMPERATURE CONTROL BY AN IMPROVED PRODUCT DISTILLATION TECHNIQUE

Joe Van Pool, Bartlesville, Okla., assignor to Phillips Petroleum Company, a corporation of Delaware Application January 3, 1957, Serial No. 632,362

7 Claims. (Cl. 260—683.4)

This invention relates to alkylation. In one of its aspects, this invention relates to a method for controlling the alkylation reaction by removing heat of reaction by cooling at least one of the reaction mass components by indirect heat exchange between said component and at least a portion of the alkylation product which has been cooled by evaporative cooling, followed by passing said cooled, now warmed, product to fractionation together with the vapors which have been formed during said cooling. In another of its aspects, the invention relates to a method as described wherein the now warmed product is used as motive fluid or driving force for a suction producing system, the suction of which is applied to cause said evaporative cooling, the vapors produced in said cooling and the motive fluid being then passed to fractionation.

This invention is particularly applicable to a process for effectively utilizing heat exchange in an alkylation process and will be described in relation thereto. It is also applicable to other heat controlled reactions. One skilled in the art of reaction control will recognize that this invention is primarily one of a physical character.

Since the invention is of especially interesting applicability to the alkylation of an isoparaffin with an olefin in the presence of an acid catalyst, such as liquid hydrogen fluoride, it is now described as applied to such a process. As is known, the hydrocarbons mentioned are contacted with the acid in a so-called contactor vessel. The reaction mass is then led to an acid settler wherein a hydrocarbon phase and an acid phase are formed and recovered therefrom.

According to the present invention, the acid recovered from the acid-settler is cooled indirectly by the hydrocarbon liquid product which is first cooled by evaporation of a portion thereof. The hydrocarbon liquid is then used in heat exchange with the acid or any other feed to the contactor vessel or with its contents or a portion thereof, and then is charged with the vapors produced, during said evaporation, to conventional separation-depropanizing-acid stripping, deisobutanizing, etc.

It is known that the alkylation reaction, in which, say, an olefin and isoparaffin are reacted in the presence of a liquid alkylation catalyst such as HF, is an exothermic system. The heat produced by the reaction must be continuously removed from the system in order to maintain the reaction within the desired conventional limits. Presently used methods for controlling this temperature include use of hair-pin cooling bundles in the contactor; other processes indirectly cool the reactants and/or liquid catalyst prior to charging to the contactor; still other processes separate the hydrocarbon phase, effect evaporation of part of the hydrocarbon to cool the remaining liquid hydrocarbon which is indirectly exchanged with acid catalyst charged to the contactor. This evaporation of part of the hydrocarbon is effected by compressors decreasing the pressure on the liquid; the produced vapors are compressed, cooled, and returned to the reactor. The return of the light vapors (condensed) to the reactor is not desired due to the loading of the reaction system with inerts such as propane.

It is an object of this invention to provide an improved operation in which heat control is effected while heat economy is practiced. It is another object of this invention to provide a process wherein cooling is accomplished by cooling a reaction product by evaporative cooling and using the cooled product for heat removal, at the same time efficiently recovering the heat taken up by said cooled product as well as by vapors produced during said evaporative cooling. A further object is the provision of a motive fluid or driving force fluid for an eductor or vacuum producing means permitting efficient recovery of heat in said cooled product, after it has been used for heat removal, and for recovery of heat in the said vapors. A still further object is the cooling control of a reaction, say, an alkylation reaction, in which, say, an isoparaffin is alkylated with an olefin, coupled with a modus operandi whereby a fractionation operation removes undesired reaction product components from the reaction product, used for the cooling, before desired components thereof are returned to the reaction zone. Other aspects, objects as well as the several advantages of the invention are apparent from this disclosure, the drawing and the appended claims to the invention.

Thus, according to the present invention, there is provided in a process or operation wherein organic compounds are reacted with heat evolution in a reaction zone from which liquid reaction products are recovered and fractionated to obtain desirable reactant materials which are returned to said zone and wherein there is present in said liquid reaction product material which is undesirable in said reaction zone, the step of cooling by evaporation at least a portion of said liquid reaction product; passing thus cooled reaction product into heat exchange relationship with at least one component entering into the reaction being conducted, thus warming said cooled reaction product; passing said now warmed reaction product as well as vapors produced during said evaporative cooling to fractionation, fractionating to obtain desirable reactant materials and returning said reactant materials to said reaction, thus avoiding return of any undesirable fractionatable components of said vapors to the reaction zone.

Also, there is provided according to the present invention, an operation, as just set out, wherein the now warmed liquid reaction product is used as motive fluid for a vacuum producing system, the suction of which is applied to effect said cooling by evaporation and wherein said thus used product and vapors formed during said evaporation are passed to said fractionation.

The invention is an improvement over the known processes in utilizing heat exchange and in processing vapors. As applied to alkylation of hydrocarbons, the liquid hydrocarbon, in the fractionator feed surge vessel, is withdrawn by the conventionally used pump and acts as the driving force on the eductor. This decreases the vessel pressure and effects evaporation of light hydrocarbons. This evaporation cools the remaining liquid hydrocarbon. This cooled hydrocarbon is pumped through an indirect heat exchange unit to cool recycle acid also being passed therethrough. The now warm hydrocarbon is used to drive the eductor and combined with the produced vapors is charged to the conventional fractionation zones. The light vapors produced in cooling the liquid hydrocarbon are not recycled to the reactor, which avoids loading this unit with inerts which are vented from the system by the fractionation step. The prior art requires compression, cooling, and condensing of the light vapors which are returned to the reactor while the invention cools the recycled acid, or other reaction mass component, as desired, and retains the heat of the vapors which is advantageously used in the fractionation zones.

Figures I and II, attached, show two embodiments of my invention. Figure I shows the conventional contactor 10 to which is charged the olefin 11, the isoparaffin 12, the recycle isoparaffin 13, and the liquid alkylation catalyst 14. Emulsion 15 from the contactor is passed to the conventional acid-settler 16. Leg 17 allows accumulation of acid which is recycled to contactor 10 via indirect heat exchanger 18 and line 19. Separated hydrocarbon is passed via 20 to the fractionator feed surge 21. Vapors are removed from 21 via line 22 through eductor 23 powered by the now cool liquid passed via line 24, pump 25, line 26, heat exchanger 18, and the now warm hydrocarbon actuates eductor 23. The warm hydrocarbon-vapor mixture is charged to via 27 to the depropanizer-acid stripper (not shown). These produced vapors contain also HF and the catalyst is separated from the hydrocarbon in the conventional depropanizer-acid stripper prior to deisobutanizing.

Figure II, the second embodiment, does not show the contactor nor fractionation zones. This system employs a combined acid settler-feed surge vessel 100. The operation is similar to that of Figure I and the primed numbers represent equivalent flows in Figure II as compared to Figure I. This system effects a higher concentration of HF in the produced vapors; however, the depropanizer-acid stripper removes the HF prior to deisobutanizing, and the inerts are not recycled to the contactor as is done in the art.

*Example*

(a) Line 20, total hydrocarbon:
  B/hour _____ 1475
  Temperature, ° F _____ 100
  Pressure, p.s.i.g. _____ 71
(b) Line 22, light hydrocarbon: B/hour _____ 135
(c) Line 26, heavy hydrocarbon:
  B/hour _____ 1340
  Temperature, ° F _____ 78
(d) Line 17, acid to recycle:
  B/hour _____ 738
  Temperature, ° F _____ 100
(e) Line 19, cooled acid to contactor:
  B/hour _____ 738
  Temperature, ° F _____ 91.5
(f) Line 27, to separation:
  B/hour,[1] _____ 1475
  Temperature, ° F _____ 100.5

[1] Of the total stream of 1475 barrels per hour, 62 barrels are in vapor form which total stream is charged to the fractionator at 100.5° F. About 50 percent of the vapor in line 22 is condensed with the liquid in line 27.

The advantages of this invention include chilling the recycled acid from 100° F. down to 91.5° F. which effects cooling of the reactor to produce higher quality and quantity of alkylate therein; it being known in the art that the cooler reaction produces improved alkylate quantity and quality. Also, stream 27 charged to fractionation has a greater heat content than the conventional process. That is, the temperature is slightly higher (100.5° F. as compared to 100° F.), but more importantly the stream has about 5 percent vapor (and the heat content thereof) which is charged to the fractionation step.

In many alkylation operations, cooling water is at a premium. This invention uses electrical or steam power to drive the pump 25 which actuates the eductor to effect evaporational cooling of hydrocarbon in tank 21. The cooled hydrocarbon is used as an indirect heat exchange medium with the contactor charge materials instead of using cooling water (which is not available). In a sense, the invention is applicable to substitute electrical or steam power which is available for cooling water which is not available or which may be available only at a large premium.

Further, in the system of the invention, inerts are not recycled to the contactor in which, as is known in the art, build up of inerts is detrimental.

It will be obvious to one skilled in the art in possession of this disclosure that the invention being of physical character, as stated, can be applied to other operations.

Reasonable variation and modification are possible within the scope of the foregoing disclosure, drawing and the appended claims to the invention the essence of which is that vapors formed during evaporative cooling of a reaction product to obtain a cooling medium for control of a reaction mass from which said product is obtained are passed directly to fractionation, or other separation treatment, thus avoiding return to the reaction mass of undesired components when desired components are returned or when the said mass is cooled, as described; and that when the cooling medium has been used, it can be and, in a preferred embodiment, is used to drive a suction producing system thereby enabling more efficient operation and recovery of heat values in said medium and in the vapors which are produced during said evaporative cooling.

I claim:

1. In the exothermic alkylation of an isoparaffin with an olefin in the presence of a catalyst in an alkylation zone wherein an excess of isoparaffin is employed and wherein said excess of isoparaffin is recovered by fractionation from the obtained alkylation reaction product, which product contains inerts not desired in the alkylation zone, the improvement in the control of the temperature of said reaction zone which comprises partially evaporating in an evaporation zone at least a portion of said reaction product to obtain a cooled portion of reaction product and vapors, using a portion of said reaction product as motive fluid for a vacuum producing system, the suction of which is applied to said evaporation zone; bringing said cooled reaction product into indirect heat exchange relationship with at least one of said isoparaffins, olefin and catalyst to remove heat therefrom; fractionating all of said vapors and said reaction product used as motive fluid so as to remove said inerts from the alkylation process and then returning only desirable constituents of said vapors to the process.

2. In the alkylation of hydrocarbons wherein an alkylatable hydrocarbon is alkylated with an alkylating hydrocarbon in the reaction zone with evolution of heat wherein there is obtained a hydrocarbon product which is fractionated and from which at least one fraction thus obtained is returned to the reaction zone as a desirable reactant therein and another fraction is removed from the process as undesirable in said reaction zone, the improvement comprising cooling at least a portion of said product by evaporation of a part of it, obtaining vapors; using a portion of said product as motive fluid in a vacuum producing system, the suction of which is applied to said evaporation, causing indirect absorption of heat between cooled product thus obtained and at least one material alkylated in said zone, thus warming said cooled product so used; and then passing said cooled product, now warmed, together with said vapors and with used motive fluid, to fractionation, thus avoiding return to said zone of any undesirable fraction and using, to advantage, heat in said now warmed product and vapors.

3. The alkylation of an alkylatable compound with an alkylating compound in a reaction zone in the presence of a catalyst which comprises introducing said compounds into admixture with said catalyst in the reaction zone, therein causing alkylation to occur with evolution of heat; recovering a phase containing alkylated compounds, compounds desirably returned to the reaction zone and inerts which are undesirable in said zone; cooling at least a portion of said phase by an evaporation process; using a portion of said phase as motive fluid for a vacuum producing system, the suction of which is applied to said evaporation, employing the cooled phase indirectly to absorb heat, evolved as stated, and then subjecting vapors formed during said evaporation and used motive fluid to fractionation before any portion of them are returned to said reaction zone, thus avoiding return of inerts to said reaction zone.

4. An alkylation according to claim 3 wherein the heat is directly absorbed by cooling the catalyst prior to its introduction into the reaction zone by contacting it indirectly with said cooled phase.

5. In an alkylation operation wherein organic compounds are alkylated by an alkylation reaction with heat evolution in the reaction zone the steps of partially evaporating an organic liquid phase obtained from the reaction zone and containing a fraction which is desirably returned to the reaction zone as well as undesirable inerts; using a portion of said liquid phase as motive fluid in a vacuum producing zone, the suction of which is applied to said evaporating, passing the cooled organic phase thus obtained into indirect heat exchange with at least one component of the alkylation reaction, so as to control the temperature of said reaction; and then, before passing any part of vapors formed during the partial evaporation to said reaction, subjecting them to fractionation together with used motive fluid to remove inerts therefrom, thus making use of their heat content and avoiding return of inerts to said reaction zone.

6. In an operation wherein organic compounds are reacted with heat evolution in a reaction zone from which liquid reaction products are recovered and fractionated to obtain desirable reactant materials which are returned to said zone and wherein there is present in said liquid reaction product material which is undesirable in said reaction zone, the step of cooling by evaporation at least a portion of said liquid reaction product, employing a portion of said liquid as a motive fluid for a vacuum producing system, the suction of which is applied to effect said cooling by evaporation of said at least a portion of said liquid reaction product, passing thus cooled reaction product into heat exchange relationship with at least one component entering into the reaction being conducted, thus warming said cooled reaction product; passing said now warmed reaction product as well as vapors produced in said evaporative cooling to fractionation together with said portion of said liquid reaction product which has been used as a motive fluid; fractionating to obtain desirable reactant materials and returning said reactant materials to said reaction, thus avoiding return of any undesirable fractionatable components of said vapors to the reaction zone.

7. An apparatus for conducting exothermic, temperature-controlled reactions which comprises a reactor; means for feeding reaction components to said reactor; means for receiving liquid reacted product from said reactor; means for partially evaporating and thus cooling at least a portion of said received liquid product; means for creating a suction in said means for partially evaporating said liquid product, means for passing cooled liquid product to said means for creating a suction as motive fluid therefor; means for passing cooled liquid product, thus obtained, into indirect heat exchange relationship with at least one of said reaction components; means for fractionating said liquid product; and means for passing vapors from said means for partially evaporating liquid product together with liquid product which has been used as motive fluid directly to said means for fractionating said liquid product.

References Cited in the file of this patent

UNITED STATES PATENTS

| | | |
|---|---|---|
| 2,088,609 | Randel | Aug. 3, 1937 |
| 2,152,663 | Randel | Apr. 4, 1939 |
| 2,457,564 | Kniel | Dec. 28, 1948 |
| 2,649,486 | Putney | Dec. 29, 1953 |
| 2,664,452 | Putney | Dec. 29, 1953 |